(12) United States Patent
Daudel et al.

(10) Patent No.: US 6,260,358 B1
(45) Date of Patent: Jul. 17, 2001

(54) MULTI-CYLINDER INTERNAL COMBUSTION ENGINE WITH AN EXHAUST-GAS TURBOCHARGER

(75) Inventors: Helmut Daudel, Schorndorf; Helmut Finger, Leinfelden-Echterdingen; Peter Fledersbacher; Siegfried Sumser, both of Stuttgart, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/551,164

(22) Filed: Apr. 17, 2000

(30) Foreign Application Priority Data

Apr. 22, 1999 (DE) .................................. 199 18 232

(51) Int. Cl.$^7$ ...................................... F02D 23/00
(52) U.S. Cl. .............................. 60/602; 60/605.1; 415/42; 415/45
(58) Field of Search .................... 60/602, 605.1; 415/36, 43, 44, 45

(56) References Cited

U.S. PATENT DOCUMENTS 5,454,225 * 10/1995 Sumser et al. ...................... 60/602
6,073,447 * 6/2000 Kawakami et al. .................. 60/602

FOREIGN PATENT DOCUMENTS 31 45 835   5/1983  (DE) .
32 00 521  10/1992  (DE) .

* cited by examiner

*Primary Examiner*—Hoang Nguyen
(74) *Attorney, Agent, or Firm*—Klaus J. Bach

(57) ABSTRACT

In a multi-cylinder internal combustion engine including an exhaust gas turbocharger to which at least two separate exhaust lines extend from different groups of cylinders of the engine, the exhaust lines have discharge openings arranged adjacent one another along a control surface area and a control slide member supported so as to be movable relative to the exhaust gas discharge openings includes wall portions movable with the slide member between a position in which the wall portions of the slide member are in alignment with stationary wall portions between the discharge openings for maintaining the exhaust gas flow passages separated from one another and a position in which the wall portions on the slide member are out of alignment with the stationary wall portions, wherein the exhaust gas lines are in communication with one another.

13 Claims, 2 Drawing Sheets

MULTI-CYLINDER INTERNAL COMBUSTION ENGINE WITH AN EXHAUST-GAS TURBOCHARGER

BACKGROUND OF THE INVENTION

The invention relates to a multi-cylinder internal combustion engine with an exhaust-gas turbocharger and with at least two separate exhaust-gas lines to the turbine of the exhaust-gas turbocharger which are assigned to different cylinders or cylinder groups, and which can be joined ahead of the turbine or maintained separated depending on the operating condition of the engine.

In the case of supercharged internal combustion engines, in particular engines with an unfavourable ignition sequence, such as, for example, 8- or 5-cylinder engines, the charge exchange can be improved by feeding the turbine with separate exhaust-gas streams from different cylinders or cylinder groups. With pulse charging, in which, where appropriate, the exhaust gases from each cylinder are supplied individually to the turbine, interaction of the cylinders with one another is reduced or avoided. Some of the otherwise unusable expansion energy of the cylinders can be recovered by means of pulsed charging, whereby the transport of energy to the turbine is greatly improved. Particularly in the lower to medium load and speed range of the internal combustion engine, the delivery of air to the engine is assisted by the increased turbine power and the correspondingly increased compressor output of the exhaust-gas turbocharger. However, in the upper load range, for example above the medium speed of the internal combustion engine, conventional turbine designs will give rise, in the case of pulsed charging, to overcharging of the engine.

DE 32 00 521 C2 proposes an arrangement which provides two parallel exhaust-gas lines for conducting the exhaust gases to the turbine. The exhaust-gas lines have a connection upstream of the turbine and can be fluidically connected or they can be kept separated depending on the position of an actuator. The actuator is designed as a rotatable intermediate wall of the turbine inlet ports, having an axis of rotation coinciding with the turbine axis. The rotatable intermediate wall is controlled by a control unit and is brought into one of the end positions, as required, depending on the operating load. For pulsed charging in the lower partial load range, the exhaust-gas lines are separated, but they are in communication with one another in the other end position of the intermediate wall.

In the known device, in which the rotatable intermediate wall between two adjacent ports controls the fluidic communication or separation between the exhaust-gas streams from the cylinders to the turbine, effective pulsed charging and the change-over between the two charging methods available can not be achieved for multicylinder internal combustion engines, or only with a high structural outlay. Each pair of exhaust-gas lines has to have its own actuator, and the actuating movements of the various actuators must be synchronized.

It is the object of the present invention to provide on internal combustion engine, which, with a low structural outlay, permits communication between, or separation of, the exhaust-gas lines upstream of the turbine, as required.

SUMMARY OF THE INVENTION

In a multi-cylinder internal combustion engine including an exhaust gas turbocharger to which at least two separate exhaust lines extend from different groups of cylinders of the engine, the exhaust lines have discharge openings arranged adjacent one another along a control surface area and a control slide member supported so as to be movable relative to the exhaust gas discharge openings includes wall portion movable with the slide member between a position in which the wall portions of the slide member are in alignment with stationary wall portions between the discharge openings for maintaining the exhaust gas flow passages separated from one another and a position in which the wall portions on the slide member are out of alignment with the stationary wall portions, wherein the exhaust gas lines are in communication with one another.

According to the invention, the actuator for separating or joining the exhaust-gas lines is designed as a control slide structure, which includes wall portions of the exhaust-gas lines and is arranged in a region of the exhaust-gas lines in which the latter lie approximately in one plane one adjacent the other. When the control slide structure is in the closed position, the moveable wall portions are disposed adjacent the fixed wall portions of the exhaust-gas lines, which are thus fluidically separated from one another. For joining the exhaust-gas lines, the moveable wall portions are brought out of alignment with the containing line walls such that the adjacent the exhaust-gas lines are joined. In this case, by means of the slide according to the invention, all the exhaust-gas lines can be simultaneously interconnected, or if required, separated, in order to operate the internal combustion engine with pulsed charging.

Expediently, the control slide structure is arranged in the region of the openings of the exhaust-gas lines into the turbine and can thus be integrated into the turbine housing. The path of the exhaust-gas lines between the internal combustion engine and the exhaust-gas turbocharger is freely selectable and, even in the case of arrangements according to the invention in which each cylinder is to be assigned a separate exhaust-gas line, a small construction volume for the internal combustion engine can thus be achieved. The control slide structure may advantageously be designed to be axially and/or rotatably moveable.

In a preferred embodiment of the invention, the control slide structure is designed as a rotary slide which is in the form of an annular disc and which is arranged concentrically to the turbine axis. The openings of the exhaust-gas lines into the turbine housing in this case extend around the axis of rotation of the turbine in the form of a sector of a circle, the respective exhaust-gas streams flowing into the turbine approximately tangentially. In this case, the opening sectors of the exhaust-gas lines can be separated from, and connected to, one another by means of wall portions on the rotary slide. The opening sectors are advantageously arranged at equal circumferential angles around the turbine axis, adjacent exhaust-gas lines having a common wall portion in the region of the openings.

It is considered to be expedient if the control slide structure carries a projecting tongue for each exhaust-gas line, the said tongues being distributed uniformly over the circumference of the rotary slide. When the rotary slide is in the closed position for the purpose of pulsed charging, the tongues are in alignment with the common end portions of the walls of the exhaust-gas lines in the opening region, and the cylinder exhaust gases are thus guided individually in separate streams into the turbine. In this case, the thickness of the tongues and the wall thickness of the common end portions of the exhaust-gas lines are approximately equal.

One or more passage orifices may be provided in the control slide structure in the regions between the tongues, the said orifice or orifices lying radially adjacent an entrance, of the discharge line for exhaust gases covered by the rotary slide. In this case, the passage orifice can be brought into overlap with the entrance and interacts with the edge of the entrance like a valve. The discharge line can thus be controlled via the position of the control slide structure or, in the version, in which the actuating slide is a rotary slide, via the angular position of the rotary slide. The discharge line from the turbine housing expediently opens into the charge-air line downstream of the compressor of the exhaust-gas turbocharger and may be used for purposes of exhaust-gas recirculation or else for diverting charge air to the exhaust-gas tract of the internal combustion engine.

An exemplary embodiment of the invention is explained in greater detail below with reference to the drawing:

DESCRIPTION OF A PREFERRED EMBODIMENT

Figure 1:
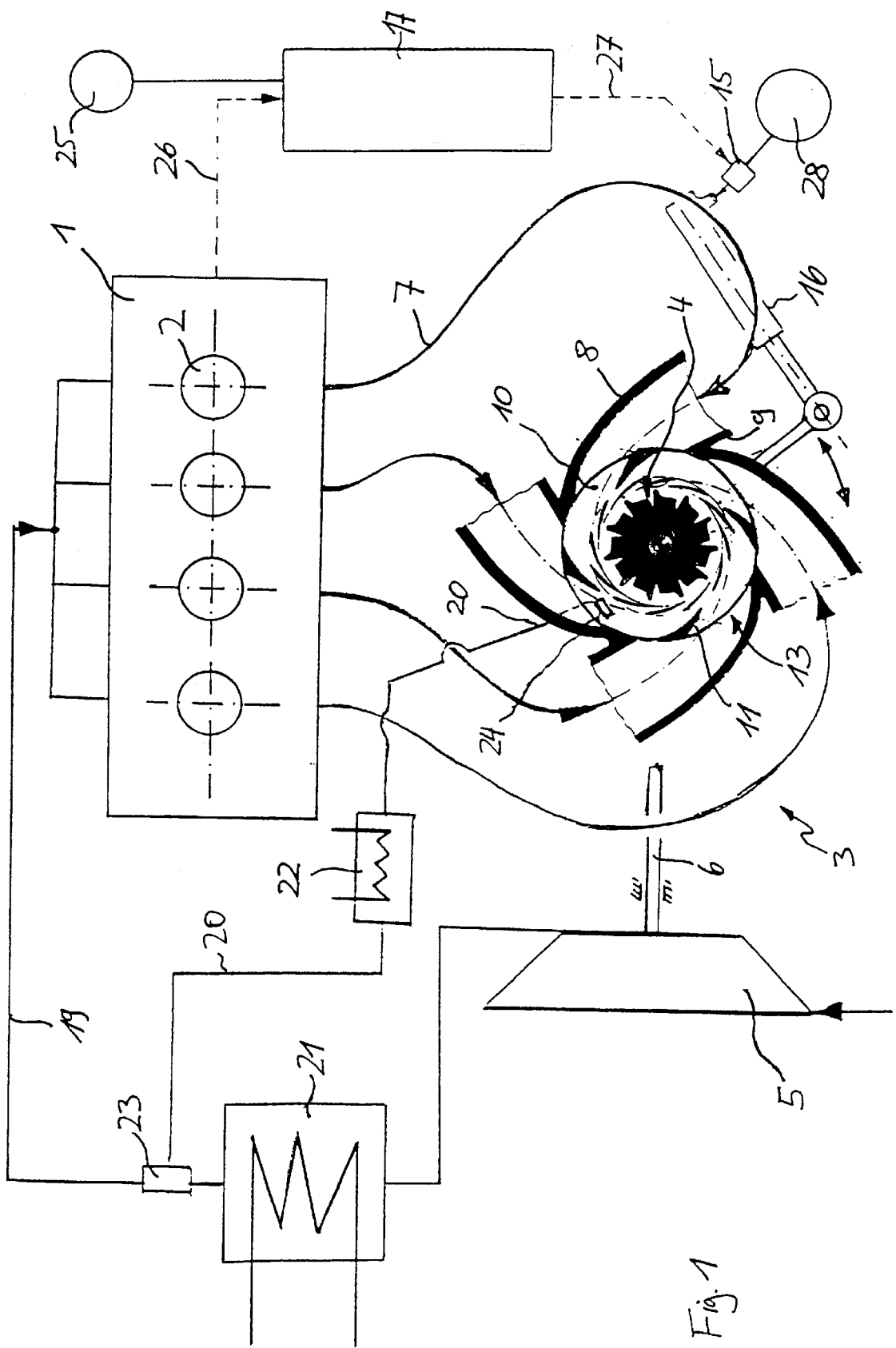
FIG. 1 shows a diagrammatic view of an internal combustion engine according to the invention with an exhaust-gas turbocharger.

FIG. 1 shows an internal combustion engine 1 with, for example, four cylinders 2, which is charged by an exhaust-gas turbocharger 3. The exhaust-gas turbocharger 3 consists, in a way known per se, of a turbine 4 which is subjected to the exhaust gases from the cylinders 2 and drives a compressor 5 by way of a charger shaft 6. The compressor 5 supplies compressed combustion air, via a charge-air line 19, to the cylinders 2. A charge-air cooler 21 is arranged in the charge-air line 19.

The turbine 4 is of a multi-segment design, wherein the exhaust gases from each cylinder 2 are supplied to the turbine via a separate exhaust-gas line 7. The exhaust-gas streams from the cylinders act on the turbine approximately tangentially, the openings 13 of the exhaust-gas lines 17 being grouped in the form of a sector of a circle at equal circumferential angles around the turbine 4.

The openings 13 of the exhaust-gas lines 7 are arranged in a common plane, the walls 8, 9 of adjacent exhaust-gas lines 7 forming a common end portion. The turbine 4 is surrounded by a rotary slide 10 which is in the form of an annular disc and carries a projecting tongue 11 for each exhaust-gas line 7, the said tongues being arranged with equal circumferential spacing. The rotary slide 10 is rotationally moveable about the turbine axis, the tongues 11 being capable of being brought, as desired, into alignment with the fixed wall portions 8, 9 of the exhaust-gas lines 7. In the position shown, the tongues are out of alignment with the fixed wall portions 8, 9, so that the exhaust-gas lines 7 are in fluid communication and the exhaust gases from all the cylinders are directed in a common flow into the turbine 4. For operation, in the lower part-load range of the internal combustion engine 1, the rotary slide 10 is moved to the closed position where the tongues 11 are in alignment with the fixed wall portions 8, 9, so that the exhaust-gas streams from the cylinders 2 are introduced separately into the turbine. The efficiency of the turbine 4 can be raised in this way because the transport of energy to the turbine 4 is improved during pulsed charging.

The rotary slide 10 is provided with an actuating drive 15, which is connected to a control unit 17 via a control line 27.

On the basis of an input signal 26 with information on the operating point of the internal combustion engine 1, the control unit 17 generates actuating commands for the actuating drive 15 and brings the rotary slide 10 into the position provided for the prevailing operating point. The setting parameters provided for the rotary slide 10 are filed in a performance graph memory 25 and are available for the control unit 17 for readout, as needed, depending on the input signal 26. In the exemplary embodiment shown, a pneumatic actuating drive 15 is provided with a push rod capable of being pushed pneumatically out of the cylinder so as to act on the rotary slide 10 via a pivoting lever. The pneumatic actuating drive 15 is provided with a pressure accumulator 28. Other actuating drives such as electric drives may also be used.

A part quantity of the exhaust-gas from the internal combustion engine 1 can be recirculated from the turbine 4 to the charge-air line 19 via a re-circulation line 20. The re-circulation line 20 joins the fresh air intake duct downstream of the compressor 5 and the charge-air cooler 21, a mixer 23 being arranged in the air intake duct 19. Furthermore, an exhaust-gas cooler 22 for the re-circulated exhaust-gas is provided in the re-circulation line 20. Opening of the re-circulation line 20 is controlled by the rotary slide 10, which, depending on its position, covers the entrance orifice 24 to the re-circulation line 20 and the turbine 4. For opening the re-circulation line 20, the passage orifice 24 is brought into overlap with the entrance of the re-circulation line 20 by rotation of the rotary slide. The pivoting range of the rotary slide 10, which is provided for purposes of controlling the discharge line 20, is adjusted via the angular positioning of the passage orifice 24. The lateral boundary of the passage orifice 24 in the circumferential direction of the rotary slide 10 interacts with the orifice edge of the entrance of the re-circulation line 20 and forms a control edge of a valve of the discharge line 20. The control edge is given the reference symbol 31 in FIG. 2. Alternatively to exhaust-gas recirculation, the re-circulation line may also be used for directing charge air into the turbine 4, as a result of which, particularly in the part-load range of the internal combustion engine, the fuel/air mixture ratio can be made leaner and emissions, particularly of nitrous gases, can thus be lowered.

Figure 2:
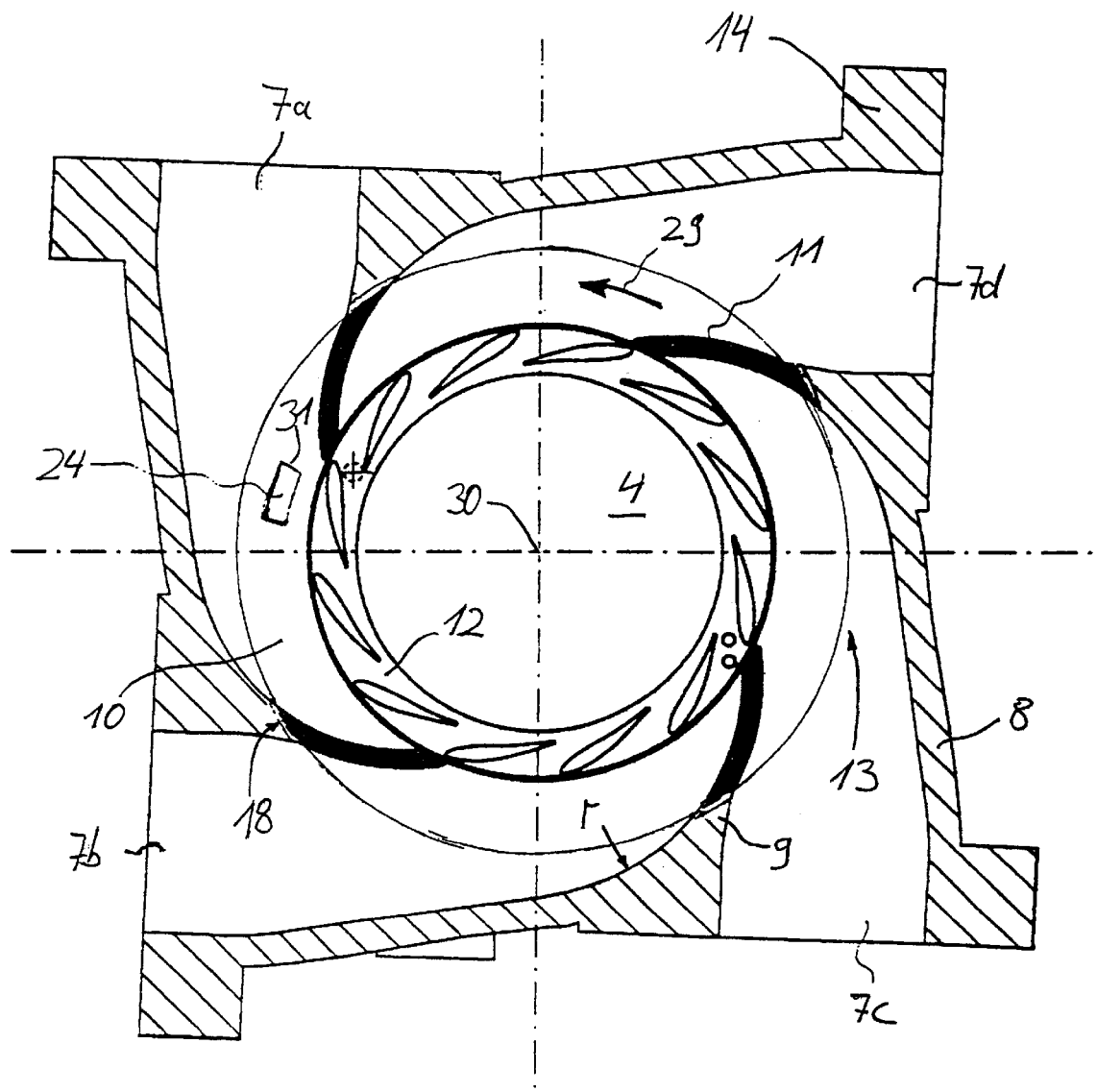
FIG. 2 shows a section through a turbine with an integrated control slide structure for connecting the exhaust-gas lines of the cylinders, as desired.

FIG. 2 shows a cross section through the turbine housing 14 of the charger turbine of the internal combustion engine according to FIG. 1. The same reference symbols as in FIG. 1 are used here for identical components. In the illustration shown, the rotary slide 10 is in the closed position, the tongues 11 being in alignment with the end portions 18 of the fixed walls 8, 9 of adjacent exhaust-gas lines 7a–7d. The exhaust-gas lines 7a–7d are thus fluidically separated from one another, so that the exhaust gases from the cylinders enter the turbine 4 separately through the flow guide vane structure 12. In the higher load range, the rotary slide 10 is rotated in the direction of the arrow 29 about the turbine axis 30. Then all the exhaust-gas lines 7a–7d are in communication via the open area provided in each case between the end portion 18 and the guide-vane structure 20.

The thickness of the tongues 11 corresponds to the wall thickness of the turbine housing 14 in the region of the common end portions 18 of the adjacent exhaust-gas lines 7a–7d. Consequently, when the rotary slide 10 is in the closed position, the side faces of the tongues 11 are aligned with the fixed walls 8, 9 of the exhaust-gas lines. The exhaust-gas lines of the four cylinders of the internal combustion engine open into the turbine 4 essentially tangentially and are arranged with a uniform spacing about the turbine axis 30. The exhaust-gas lines 7a–7d have a similar geometric shape in the region of their entrance 13 into the turbine and introduce the exhaust gas in an arc directed inwardly relative to the turbine 4. The tongues 11 are curved so as to follow the arc radius r of the exhaust-gas lines 7a–7d and thus provide for an extended guide structure for the entering exhaust-gas streams, when the rotary slide 10 is in the closed position. In this way, during pulsed charging, the exhaust gases flow into the guide vane structure 12 with an optimum entry swirl in each turbine segment separated by the tongues 11.

The rotary slide of the turbine is also used advantageously for optimizing a turbine-assisted engine braking. In the braking mode, the pressure build-up effect of the turbine on the inflowing exhaust gas is enhanced in a controlled manner, so that the internal combustion engine is braked due to the increased piston work for discharging the exhaust gases from the cylinders against the high build-up pressure upstream of the turbine. An appropriate control of the rotary slide and the effects of the tongues on the exhaust gases achieved thereby can influence the brake-power characteristic curve of the turbine. The control data required for controlling the rotary slide 10 in the engine-braking mode are deposited in the performance graph 25 of the control unit 17 and can be retrieved when there is a requirement for brake power.

What is claimed is:

1. A multi-cylinder internal combustion engine including an exhaust gas turbocharger with an exhaust gas turbine having a rotor disposed in a housing and a compressor, said internal combustion engine having at least two separate exhaust lines extending from different cylinders or groups of cylinders to said exhaust gas turbine, said separate exhaust lines having exhaust gas discharge openings arranged adjacent one another, between stationary wall portions of said exhaust gas discharge openings, along a control surface area, a control slide member supported so as to be movable relative to said exhaust gas discharge openings, said slide member having wall portions movable with said slide member and being in alignment with the stationary wall portions between said discharge openings when said slide member is in a closing position, wherein said exhaust gas lines remain separated from one another, but said exhaust gas lines being in communication with one another when said slide member is in a position in which said wall portion disposed on said slide member are out of alignment with said stationary wall portions.

2. An internal combustion engine according to claim 1, wherein said separate exhaust gas lines are connected to said turbine and said control slide member is arranged adjacent the exhaust gas line openings in said turbine to control the flow of exhaust gas from said exhaust gas lines to said turbine.

3. An internal combustion engine according to claim 1, wherein said slide member is a rotatable slide ring.

4. An internal combustion engine according to claim 1, wherein said slide member is an axially movable slide ring.

5. An internal combustion engine according to claim 1, wherein said discharge openings of said exhaust gas lines into said turbine are arranged in a circle around the axis of said turbine and said control slide member is an annular slide disc supported so as to be rotatable around said turbine axis.

6. An internal combustion engine according to claim 5, wherein said annular slide disc includes for each exhaust gas line, a tongue and said tongues are uniformly distributed over the circumference of said annular slide disc, said slide disc being rotatable between a position in which said tongues are in alignment with the exhaust line stationary wall positions so as to form wall extensions of said stationary wall portions, whereby said exhaust gas lines remain separated, and a position in which said tongues are out of alignment with said stationary wall portions whereby said exhaust gas lines are in communication with one another.

7. An internal combustion engine according to claim 6, wherein the thickness of said tongues is approximately equal to the wall thickness of said stationary wall portions.

8. An internal combustion engine according to claim 3, wherein said rotatable slide ring is arranged around a turbine guide vane structure surrounding the turbine rotor.

9. An internal combustion engine according to claim 8, wherein said exhaust gas lines open into the turbine housing tangentially to said guide vane structure and are curved toward the turbine rotor and said tongues are curved so as to tangentially join the vanes of said guide vane structure.

10. An internal combustion engine according to claim 9, wherein at least one passage orifice is provided in the annular slide member between said tongues, said orifice forming an entrance to an exhaust gas re-circulation line, which can be closed by said annular slide member.

11. An internal combustion engine according to claim 10, wherein said exhaust gas re-circulation line extends to an air supply line downstream of said compressor of the exhaust gas turbocharger.

12. An internal combustion engine according to claim 11, wherein said control slide member is operable by one of an electric, pneumatic and hydraulic actuating drive controlled by a control unit.

13. An internal combustion engine according to claim 12, wherein said control unit has a memory with predetermined positions of the rotary slide for each operating point of the engine and for a turbine-assisted engine-braking mode stored therein.

\* \* \* \* \*